United States Patent [19]

Faber

[11] Patent Number: 5,596,961
[45] Date of Patent: Jan. 28, 1997

[54] INTAKE MANIFOLD ASSEMBLY FOR FOUR-CYCLE INTERNAL COMBUSTION ENGINE

[75] Inventor: Roger A. Faber, South Lyon, Mich.

[73] Assignee: Detroit Diesel Corporation, Detroit, Mich.

[21] Appl. No.: 538,289

[22] Filed: Oct. 2, 1995

[51] Int. Cl.$^6$ .................................................. F02M 35/10
[52] U.S. Cl. .............................. 123/184.38; 123/184.42; 123/184.47
[58] Field of Search .................. 123/184.38, 184.39, 123/184.42, 184.46, 184.47, 184.53

[56] References Cited

U.S. PATENT DOCUMENTS

| | | | |
|---|---|---|---|
| 1,271,779 | 7/1918 | Schroeder et al. | 123/184.38 |
| 3,667,432 | 6/1972 | Greathouse | 123/184.38 |
| 3,811,416 | 5/1974 | Gospodar et al. | 123/184.53 |
| 3,945,357 | 3/1976 | Ableitner | 123/184.38 |
| 4,430,977 | 2/1984 | Shimada | 123/449 |
| 4,653,440 | 3/1987 | Fukuhara et al. | 123/184.38 |
| 4,848,280 | 7/1989 | Ohtsuka et al. | 123/184.42 |
| 5,074,258 | 12/1991 | Hitomi et al. | 123/184.38 |

FOREIGN PATENT DOCUMENTS

| | | | |
|---|---|---|---|
| 685492 | 7/1930 | France | 123/184.53 |
| 20647 | 9/1956 | Germany | 123/184.53 |
| 2034234 | 2/1972 | Germany | 123/184.47 |
| 3219699 | 12/1983 | Germany | 123/184.42 |
| 60-228758 | 11/1985 | Japan | 123/184.42 |
| 3-33468 | 2/1991 | Japan | 123/184.38 |
| 287812 | 3/1928 | United Kingdom | 123/184.42 |

*Primary Examiner*—David A. Okonsky
*Attorney, Agent, or Firm*—Brooks & Kushman P.C.

[57] ABSTRACT

An intake manifold assembly is disclosed for an internal combustion engine. The intake manifold assembly includes an intake manifold of a predetermined length and includes a plenum having an interior wall surface and a predetermined cross-sectional area in a plane transverse to the length of the plenum. An air inlet is located mid-way of the length of the plenum, and the air inlet is generally circular in cross-section. A plurality of outlet portions, each having an outlet port in air flow communication with the plenum, each of the outlet ports being substantially equally spaced along the length of said plenum. A cross-sectional area of the outlet port of each outlet portion is substantially equal to the cross-sectional flow area of the plenum and of the air inlet portion. A diverter partition extends integrally from the inner wall of the plenum in a direction toward the mid-point of the air inlet to divert incoming air flow and evenly distribute the air flow to each of the respective outlet ports.

14 Claims, 6 Drawing Sheets

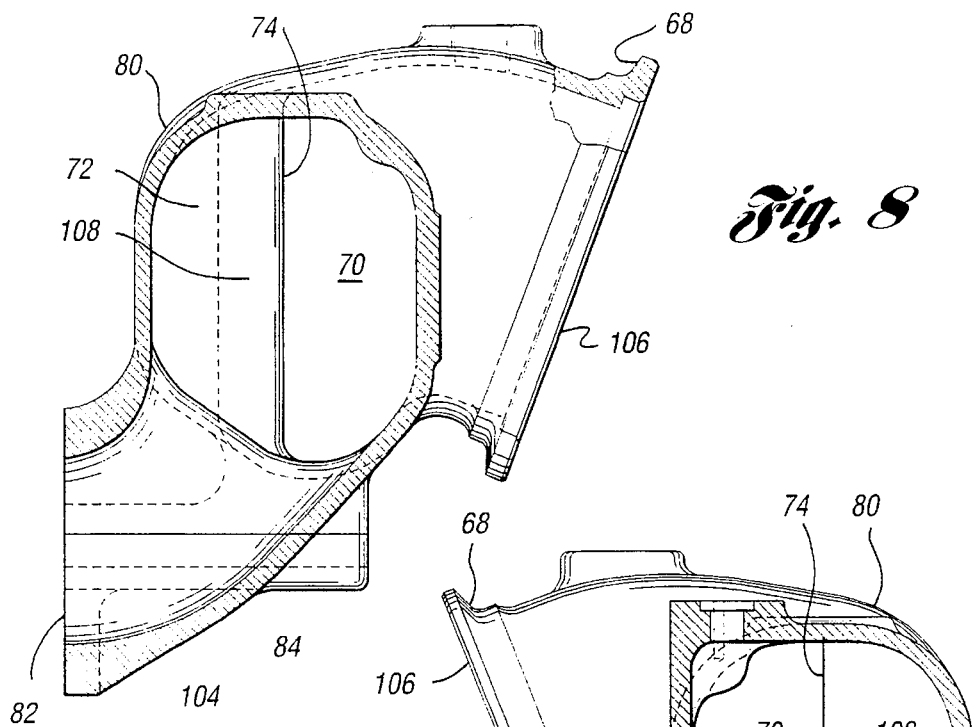
Fig. 8
Fig. 9
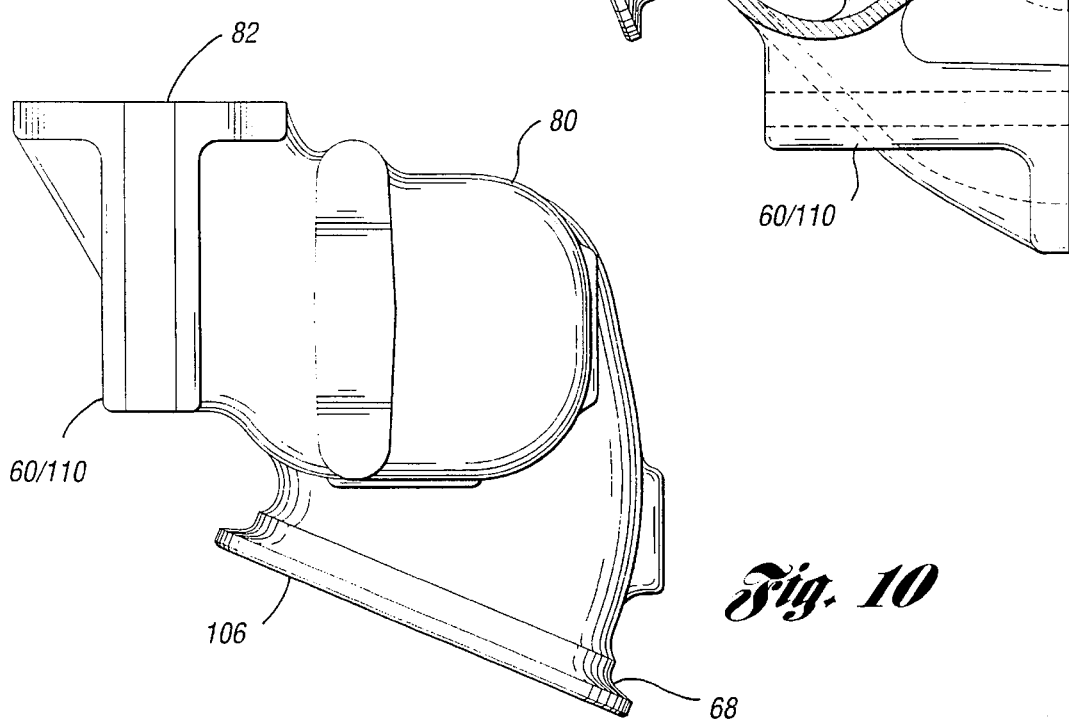
Fig. 10

5,596,961

INTAKE MANIFOLD ASSEMBLY FOR FOUR-CYCLE INTERNAL COMBUSTION ENGINE

TECHNICAL FIELD

This invention relates to intake manifold assemblies for four-cycle internal combustion engines, particularly for medium to heavy-duty truck diesel engines.

BACKGROUND ART

In the trucking industry, particularly Class 8 trucks and the like, the two-cycle diesel engine has been commonplace for many years. In more recent years, due primarily to emission standards, the industry has been demanding the more efficient burning four-cycle diesel engine. Reductions in size and weight of the engines and its components has also become a design factor, more so now than ever before. Likewise, the popularity of electronic engine controls has made possible the more precise control of engine operating parameters, and assists the downsizing and general redesign, as well as the elimination of, many of the engine components. One such example of redesign is the engine intake air manifold assembly.

It is important that each engine cylinder receive the same amount of air for the combustion process. With an engine having a single intake air manifold leading to each of the combustion chambers of an inlet engine, and having a single air intake to the manifold, this problem has conventionally been addressed by providing an extraordinarily large air plenum between the manifold intake and the manifold outlet to the respective combustion chambers. Thus, any difference in air velocity is in effect neutralized as the intake air traverses the large air plenum. The drawback to this solution however is the fact that the intake manifold is unnecessarily large, and this adds to the weight of the vehicle, as well as takes up precious space within the engine compartment.

These and other matters, among others, are addressed by the present invention.

SUMMARY OF THE INVENTION

The present invention contemplates an intake manifold assembly, particularly for a diesel-fueled vehicle, precisely sized and designed so as to be of minimum size and weight and to provide equal quantities of air to each of the vehicle combustion chambers throughout substantially the entire speed range of the engine.

The invention further contemplates an intake manifold assembly as described above, having a single inlet comprising a rotatable inlet duct in the form of an elbow whereby the inlet duct can be fixed in a variety of radial positions thus allowing a wide variation in design choice as to how the inlet air is conveyed to the intake manifold inlet.

The invention further contemplates an air intake manifold assembly of the type noted above, wherein the quantity of air being delivered through the inlet duct is uniformly distributed throughout the cross-sectional area of the inlet duct throughout its length despite variations in air flow velocity.

The invention also contemplates an air intake manifold assembly of the type described above, wherein the air intake manifold, upon receiving the uniformly distributed air mass at the outlet of the inlet duct, includes a diverter within the plenum of the intake manifold for precisely diverting air flow to each of the engine cylinders oriented on either side of the divider.

The invention also further contemplates an intake air manifold of the type described above, wherein the divider further serves the purpose of eliminating pressure pulses between the cylinders as the intake valves of each of the respective cylinders opens and closes, thereby providing the undisturbed distribution of equal air masses to each of the combustion cylinders.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 8 is a cross-sectional view taken along lines 8—8 of FIG. 5;

FIG. 9 is a cross-sectional view taken along lines 9—9 of FIG. 5; and

FIG. 10 is an end view of the intake manifold as seen from the left-hand side of FIG. 6.

BEST MODES FOR CARRYING OUT THE INVENTION

Figure 1:
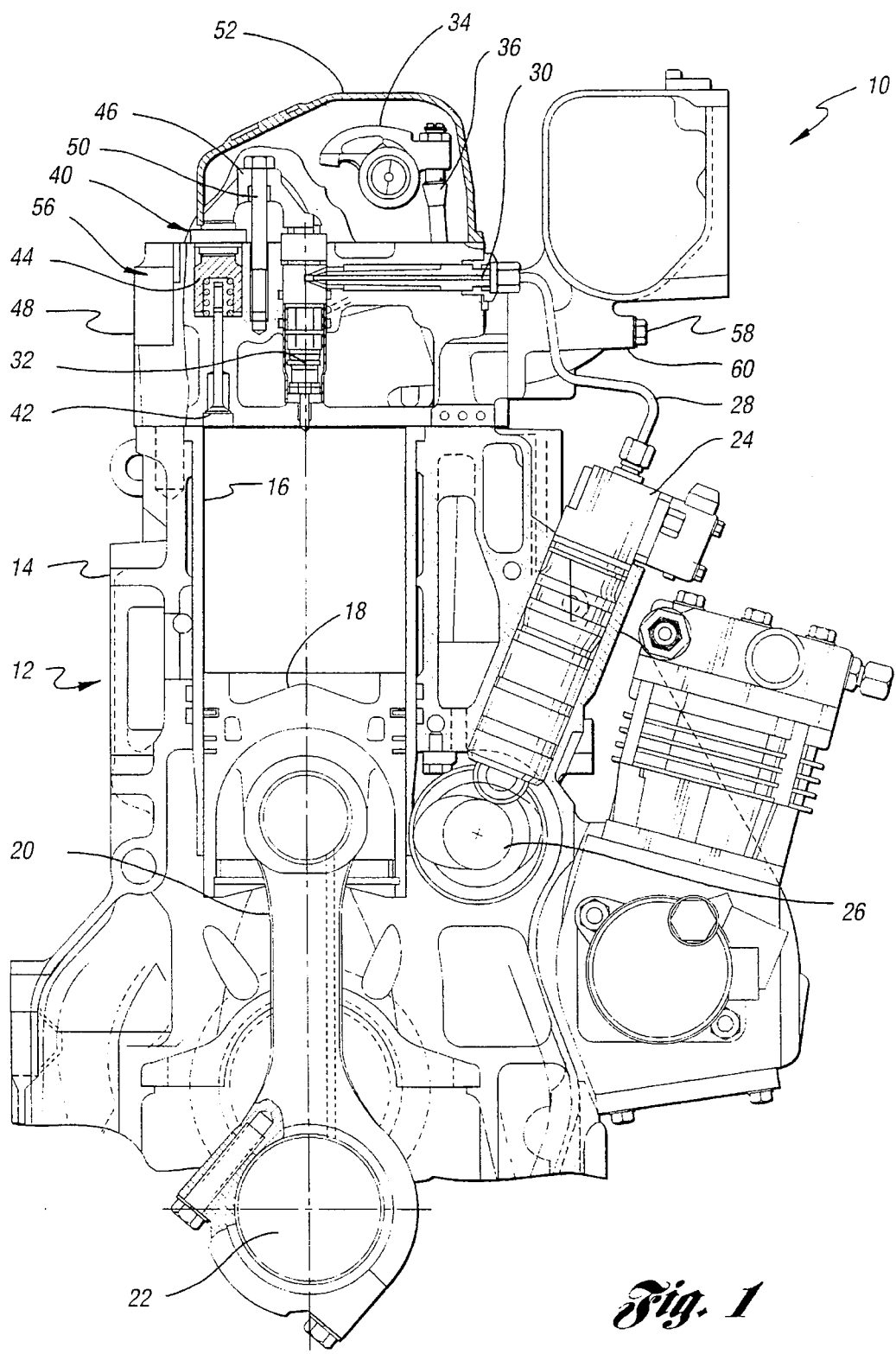
FIG. 1 is a partial cross-section taken through an engine block in a plane transverse to the axis of the crankshaft and showing generally the features of the present invention.

Looking at FIG. 1, there is shown in general block form, the intake manifold assembly 10 of the present invention. Also shown is a single piston-cylinder combination, generally designated 12, with the various components provided for feeding fuel to the combustion chamber and evacuating products of combustion. Specifically, in addition to the intake air manifold assembly 10, the engine block 14 includes a cylinder liner 16 and piston 18. The piston is driven by connecting rod 20 rotationally mounted on a crankshaft 22. An electromagnetically-controlled unit fuel pump 24, of the type generally shown in U.S. Pat. No. 4,430,977 is driven by the camshaft 26 and provides high pressure fuel through line 28, high pressure line 30, and fuel injector 32 to the top of the combustion chamber. The intake and exhaust valves, which for the engine shown there are two of each per cylinder, are driven in timed relation by a rocker arm assembly 34 which includes a push-rod 36 driven off the cam shaft 26 in a conventional fashion. Also shown is a valve-type engine brake, generally designated 40, which comprises a pulse decompression valve 42, including a hydraulically actuated piston 44 for controlling the timing and extent of travel of the valve 42. As shown, the engine brake valve assembly 40 and the fuel injector nozzles 32 are held down by a common mounting bracket 46 held fixed to the cylinder head 48 by the bolt 50. An engine valve cover 52 encloses the above-described cylinder head assembly. The engine exhaust manifold is generally designated 56.

As regards the intake manifold assembly 10, as shown, the intake manifold is side-mounted to the cylinder head by a number of bolts 58 spaced throughout its length with each fastening bolt being held within an integral boss 60.

Figure 2:
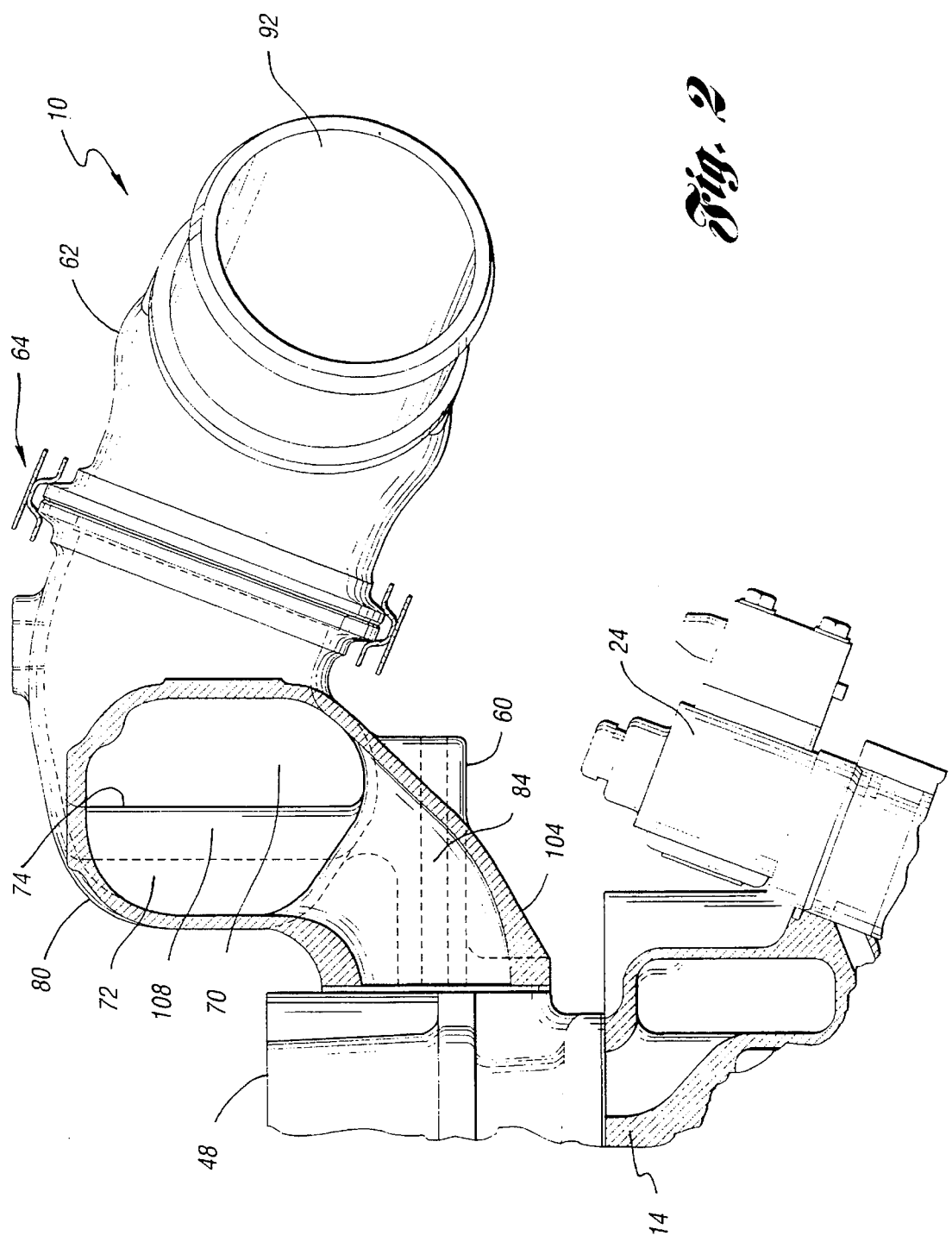
FIG. 2 is an enlarged view of that portion of FIG. 1 shown as encircled portion A, and showing the side-mounted intake manifold and inlet duct as an assembly of the present invention.

Looking also at FIG. 2, the intake manifold assembly includes an air inlet duct 62, capable of rotational adjustment, mounted in a fixed position to the air inlet of the intake manifold by a V-band-type clamp generally designated 64, the use of which is common to other intake air manifold assemblies. The inlet duct outlet and the manifold inlet interfit and engage with one another in a tongue-in-groove relation as shown more precisely in FIGS. 2, 3 and 8. Each end includes a radial flange 66,68 having a tapered outer face that enhances the ability of the V-band clamp to hold each in a fixed radial position. From the cross-section shown in FIG. 2, of the intake manifold, one observes the full cross-section of the manifold plenum 70 and the diverter plate 72 cast as an integral part of the manifold and serving to divide and divert the incoming air into two equal paths, distributing each air mass to the set of three cylinders on each side of the divider. The diverter is vertically oriented so as to be substantially transverse to the direction of incoming air, and extends to a leading edge 74 located at half the width of the plenum as taken in a plane transverse to its longitudinal axis. Although the inlet portion 76 of the manifold 80 is shown in FIG. 2 as being slightly elbow-shaped, the degree of bend is not sufficient to disturb the uniform air mass distribution across the manifold inlet, unlike the severe bend of the air inlet duct 62, as explained more fully below.

It will be noted that the diameter of the outlet 82 of the intake manifold to inlet port of the cylinder head is substantially equal in size to that of the air distribution channel 84 which is near equal, but less, in size to the size of the air plenum 70 throughout the entire intake air manifold. In the preferred embodiment described herein, the cross-sectional area of the plenum on average is 1.5 times that of each cylinder head inlet port. By this means, the air intake manifold is precisely downsized to meet the air flow requirements to each cylinder, i.e. combustion chamber, rather than being oversized to accommodate air mass flow fluctuation and uneven pressure distributions from each of the combustion chambers. In this way, in accordance with the invention, the overall size and weight of the intake manifold assembly is maintained at absolute minimum.

Figure 3:
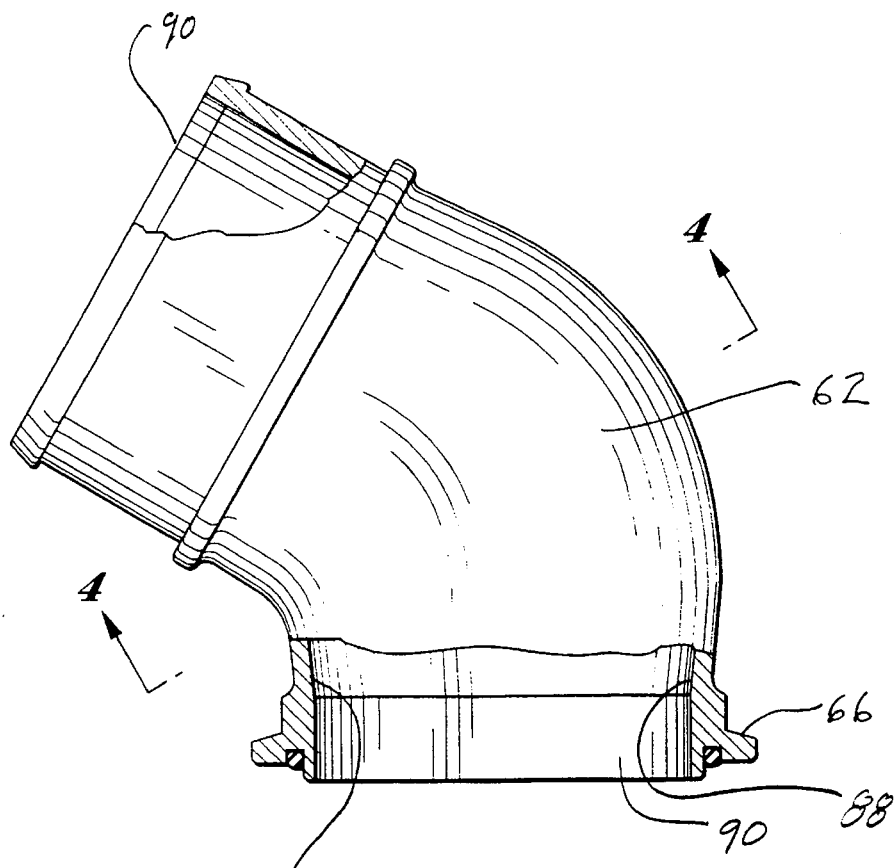
FIG. 3 is a plan view of the inlet duct shown in partial cross-section in accordance with the present invention.
Figure 4:
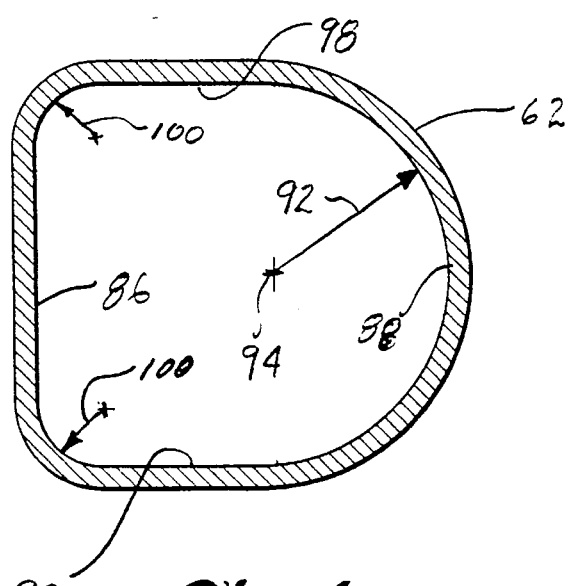
FIG. 4 is a cross-sectional view taken along lines 4—4 of FIG. 3.
Figure 5:
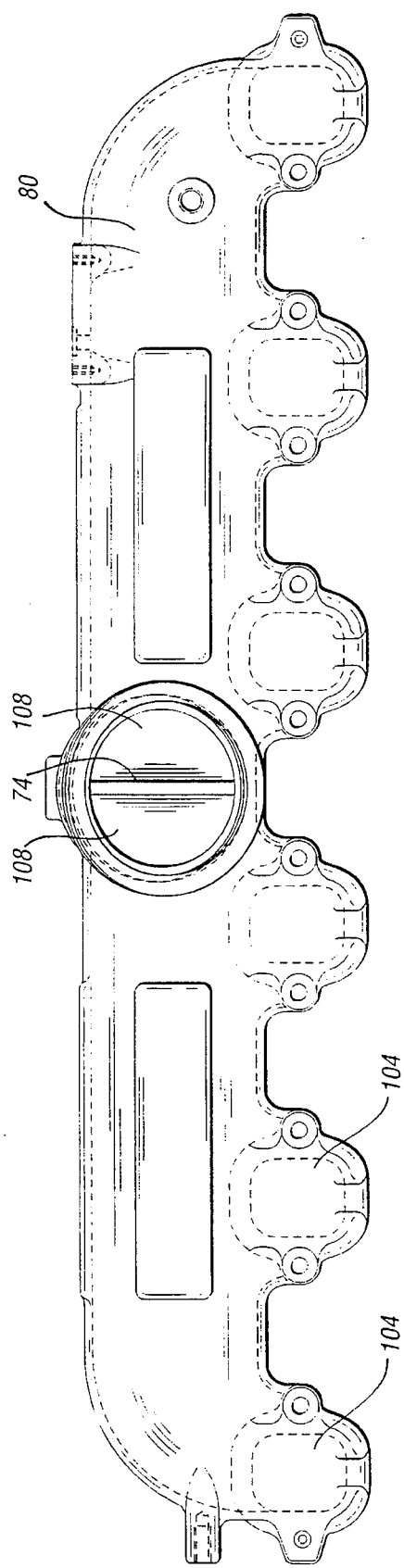
FIG. 5 is a side elevation view of the intake manifold in accordance with the present invention.
Figure 6:
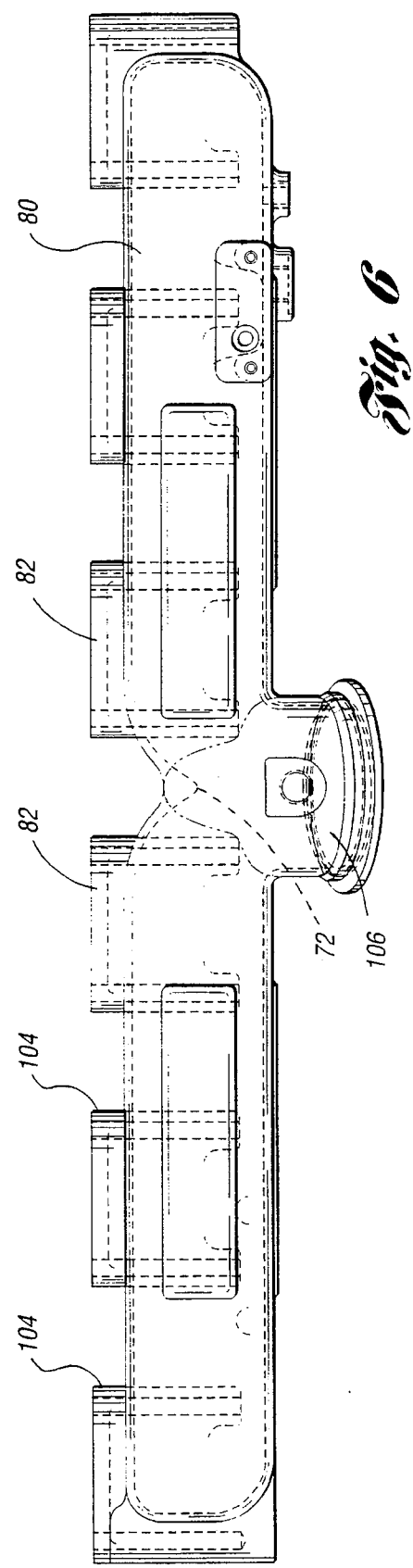
FIG. 6 is a plan view of the intake manifold in accordance with the present invention.
Figure 7:
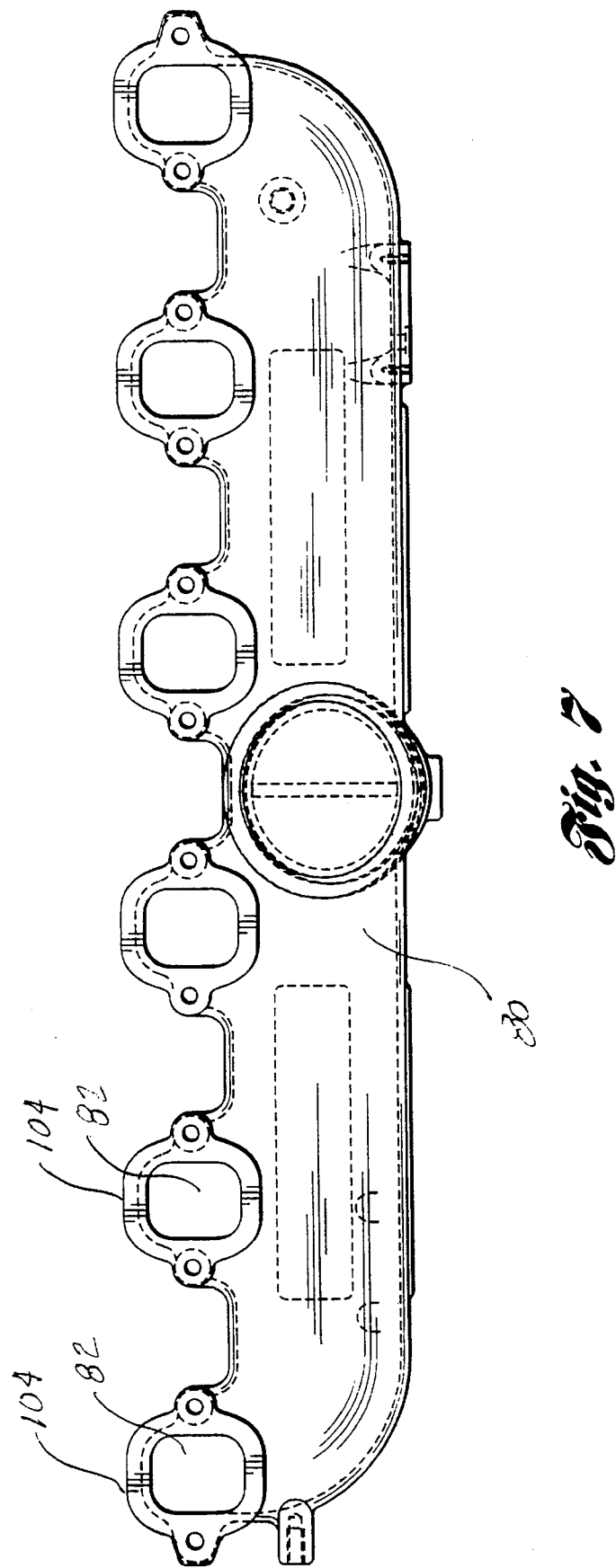
FIG. 7 is an elevation view of the intake manifold showing the side opposite that shown in FIG. 5.

The air inlet duct assembly itself, is shown in detail in FIGS. 3 and 4. The universally radially positionable air inlet duct 62 is at approximately a 45° bend. This is to provide flexibility in the manner in which the air inlet ducting leading up the air duct is routed to the manifold assembly. However, as a consequence of this large bend, the air velocity at the shortest length inner wall 86 is substantially less than the air velocity at the longest length inner wall 88. If the inlet duct were cast as an annular member, i.e. wherein the cross-sectional flow area of the duct were circular or substantially circular throughout its length, as is the convention, the air mass at the outlet end 90 of the inlet duct 62 would be unevenly distributed throughout this cross-sectional area. The relationship is determined by the continuity equation, a derivation of Bernoulli's equation, which is as follows:

$$\rho_1 V_1 A_1 = \rho_2 A_2 V_2$$

wherein:
$\rho_1$=air density in;
$\rho_2$=air density out;
$V_1$=air velocity in;
$V_2$=air velocity out;
$A_1$=cross-sectional area of the duct taken at a plane transverse to its length;
$A_2$=cross-sectional area of the air inlet duct 62 at its outlet 90 (or inlet 92, each being equal in the preferred embodiment) taken at a plane transverse to its length.

The equation assumes that the pressure at the inlet is the same as the pressure at the outlet, which is the case throughout substantially the entire operating parameters of the engine for which the present invention is designed.

The density is also equal at the air inlet outlet. Thus, the present invention assures uniform air mass distribution by altering the cross-sectional area of the air inlet duct, specifically in the manner shown in FIG. 4 wherein the spherical nature of the conventional inlet duct is maintained throughout the high velocity portion of air flow as represented by the hemisphere scribed by radius 93, which is the full 180° from the air inlet duct centerline 94. The low air flow velocity portion of the air inlet duct is constructed as a rectangle, with the low air velocity inner wall 86 being constructed as the base and including side walls 98. At the juncture of the base and sidewall there is provided a generous radius 100. As shown in the preferred embodiment, the ratio of the area of the low velocity portion (enclosed within walls 86,98) to the high velocity portion (scribed by radius 92) is approximately 3:1. This is the flow area ratio at the plane of maximum differential in air velocity through the elbow-shaped air inlet duct. In other embodiments, e.g. with an air inlet duct having a 30° bend, the least ratio will be on the order of 1.5:1. At the inlet and outlet of the duct, the flow area is circular. The transition from the inlet configuration to elbow area configuration and from there to the outlet area configuration is proportional to the change in air velocities, and in accordance with the manner directed above. In other words, as shown in the preferred embodiment, the inside of the bend cross-section increases in area to maintain constant air mass flow across the entire outlet of the elbow. The outside of the bend cross-section maintains a constant diameter hemisphere.

Looking at FIGS. 5–10 in particular, the intake manifold 80 is a side-discharge-type intake manifold wherein the outlet 82 for each cylinder is supported to the side of the cylinder head 48. The invention is not limited to a side discharge-type intake manifold assembly as will be apparent to one of ordinary skill in the art. The intake manifold includes a centrally disposed inlet portion 76, the inlet of which discharges to the plenum 70 in the manner described above. From the plenum opposite the inlet, there is located a plurality of equally spaced outlet portions 104, each including an outlet port 82 and the length of which is transverse to the plenum 70. Within the plenum directly opposite the air inlet 106 and centrally located relative to the air inlet 106, there is provided the integrally-cast diverter plate or portion 72, the apex or leading edge 74 of which, as viewed in FIG. 6, extends halfway across the plenum in the direction of the air inlet. The sidewalls 108 of the diverter includes a generous radius for uniformly turning the direction of air flow into the plenum from the transverse incoming direction to the lengthwise directional flow across the length of the plenum to the respective outlet ports. It will be noted that the cross-sectional flow area as taken in a plane transverse to the length of the intake manifold, for example as seen in FIG. 8, is approximately 1.5 times the area of the inlet port and no greater (preferably less) than that of the manifold inlet 106. In this manner, the size of the intake manifold is maintained at a minimum and an even air flow mass distribution to the respective cylinders is assured in light of the above-described design features. Each of the manifold outlet portions 104 is configured to the respective inlet port of the cylinder head and each includes a pair of diametrically opposed bosses 60 bored to receive bolts 58 for clamping the manifold to the cylinder head. Between the outlet ports, as seen in FIG. 9, the manifold is provided with a strengthening web 110 sized to accommodate the bolt bosses 60, but otherwise held to a minimum.

In light of these design configurations, the size, and consequently the weight, of the intake manifold assembly in accordance with the present invention is less than ½ (approximately 45%) that of the conventional, oversized plenum-type intake manifold assembly previously described.

The preferred embodiment has been shown and described as a side-mounted intake manifold assembly for an in-line six cylinder diesel engine. Obviously, the invention is not limited to such an engine as is equally applicable to any in-line engine. Likewise, the same principles could be applied to an intake manifold assembly for either bank of a V-type engine or to a common intake manifold of a V-type engine.

While the best mode for carrying out the invention has been described in detail, those familiar with the art to which this invention relates will recognize various alternative designs and embodiments for practicing the invention as defined by the following claims.

What is claimed is:

1. An intake manifold assembly for an internal combustion engine, said intake manifold assembly comprising:

an intake manifold of a predetermined length, said intake manifold including a plenum having an interior wall surface and a predetermined cross-sectional area in a plane transverse to the length of said plenum, an air inlet located mid-way of the length of said plenum, said air inlet being generally circular in cross-section;

a plurality of outlet portions, each having an outlet port in air flow communication with said plenum, each of said outlet ports being substantially equally spaced along the length of said plenum, the cross-sectional area of the outlet port of each outlet portion being substantially equal to the cross-sectional flow area of said plenum and of said air inlet portion; and a diverter partition extending integrally from the direction of the inner wall of said plenum in a direction toward the mid-point of said air inlet for diverting incoming air flow and evenly distributing the air flow to each of the respective outlet ports.

2. The invention of claim 1 wherein the diverter partition includes a generally vertically oriented leading edge extending halfway across the plenum in the direction of the air inlet and extending from the bottom of the plenum to the top of the plenum, each sidewall of the divider plate being curvlinear in shape and generated along the plane circumscribed by a radius extending from an axis parallel to the leading edge of the divider portion.

3. The invention of claim 2 wherein an equal number of outlet ports is located on each side of the divider plate.

4. The invention of claim 1 wherein the intake manifold assembly includes an air inlet duct secured to the intake manifold inlet in a fixed radial position, a clamping means in the form of an annular clamping ring for clamping the air inlet duct to the intake manifold in any of an infinitely variable number of radial positions, said air inlet duct being the shape of an elbow having anywhere from a 30° to 90° change in direction along its length, the air inlet duct being annular at its inlet and annular at its outlet, and the inlet and outlet being of substantially equal cross-sectional area, and the cross-sectional configuration of the elbow-shaped air inlet duct including a high velocity portion and a low velocity portion, the low velocity portion being of non-circular shape in any plane intermediate its ends such that the air mass throughout the high velocity portion of the elbow-shaped inlet duct is equal to the air mass flowing through the low velocity portion of the air inlet duct at any plane along its length and transverse to its longitudinal axis.

5. The invention of claim 4 wherein the air inlet duct at the elbow is measured in the plane transverse to the length of the duct includes a high velocity portion of hemispherical shape through 180° and having a radius equal to that at the air inlet duct inlet and outlet, and wherein the low velocity portion of the cross-sectional area is rectangular shape and has an overall area larger than that of the high velocity area portion at a ratio of 1.5:1 to 2:1 at the point along its length of greatest differential in air velocity.

6. The invention of claim 4 wherein the cross-sectional area of the high velocity portion is sized relative to the cross-sectional area of the low velocity portion pursuant to the equation:

$$\rho_1 V_1 A_1 = \rho_2 A_2 V_2$$

wherein:
$\rho_1$=air density in;
$\rho_2$=air density out;
$V_1$=air velocity in;
$V_2$=air velocity out;
$A_1$=cross-sectional area of the air inlet duct 62 at its inlet taken at a plane transverse to its length;
$A_2$=cross-sectional area of the air inlet duct 62 at its outlet 90 taken at a plane transverse to its length.

7. An air inlet duct with an elbow shape ranging from a 30° elbow to a 90° elbow for conveying air to an air intake manifold of diesel-fueled internal combustion engine, the air inlet duct comprising:

said air inlet duct being annular at its inlet and annular at its outlet, and the inlet and outlet being of substantially equal cross-sectional area, and the cross-sectional configuration of the elbow-shaped air inlet duct including a high velocity portion and a low velocity portion, the low velocity portion being of non-circular shape in any plane intermediate its ends and having a cross-sectional area greater than that of the inlet and outlet such that the air mass throughout the high velocity portion of the elbow-shaped inlet duct is equal to the air mass flowing through the low velocity portion of the air inlet duct at any plane along its length and transverse to its longitudinal axis.

8. The invention of claim 7 wherein the air inlet duct at the elbow is measured in the plane transverse to the length of the duct includes a high velocity portion of hemispherical shape through 180° and having a radius equal to that at the air inlet duct inlet and outlet, and wherein the low velocity portion of the cross-sectional area is rectangular shape and has an overall area larger than that of the high velocity area portion at a ratio of 1.5:1 to 2:1 at the point along its length of greatest differential in air velocity.

9. The invention of claim 7 wherein the cross-sectional area of the high velocity portion is sized relative to the cross-sectional area of the low velocity portion pursuant to the equation:

$$\rho_1 V_1 A_1 = \rho_2 A_2 V_2$$

wherein:
$\rho_1$=air density in;
$\rho_2$=air density out;
$V_1$=air velocity in;
$V_2$=air velocity out;
$A_1$=cross-sectional area of the duct taken at a plane transverse to its length;
$A_2$=cross-sectional area of the air inlet duct 62 at its outlet 90 taken at a plane transverse to its length.

10. The invention of claim 8 wherein the cross-sectional area of the high velocity portion is sized relative to the cross-sectional area of the low velocity portion pursuant to the equation:

$$\rho_1 V_1 A_1 = \rho_2 A_2 V_2$$

wherein:
$\rho_1$=air density in;
$\rho_2$=air density out;
$V_1$=air velocity in;
$V_2$=air velocity out;
$A_1$=cross-sectional area of the duct taken at a plane transverse to its length;
$A_2$=cross-sectional area of the air inlet duct 62 at its outlet 90 taken at a plane transverse to its length.

11. An intake manifold assembly for an internal combustion engine, said intake manifold assembly comprising:

an intake manifold of a predetermined length, said intake manifold including a plenum having an interior wall surface and a predetermined cross-sectional area in a plane transverse to the length of said plenum, an air inlet located mid-way of the length of said plenum;

a plurality of outlet portions, each having an outlet port in air flow communication with said plenum, each of said outlet ports being substantially equally spaced along the length of said plenum, the cross-sectional area of the outlet port of each outlet portion being substantially equal to the cross-sectional flow area of said plenum and of said air inlet portion; and a diverter partition extending from the direction of the inner wall of said plenum in a direction toward the mid-point of said air inlet for diverting incoming air flow and evenly distributing the air flow to each of the respective outlet ports.

12. An intake manifold assembly for an internal combustion engine, said intake manifold assembly comprising:

an intake manifold of a predetermined length, said intake manifold including a plenum having an interior wall surface and a predetermined cross-sectional area in a plane transverse to the length of said plenum, an air inlet located mid-way of the length of said plenum, said air inlet being generally circular in cross-section and including an air inlet duct secured to the intake manifold inlet in a fixed radial position, a clamping means in the form of an annular clamping ring for clamping the air inlet duct to the intake manifold in any of an infinitely variable number of radial positions, said air inlet duct being the shape of an elbow having anywhere from a 30° to 90° change in direction along its length, the air inlet duct being annular at its inlet and annular at its outlet, and the inlet and outlet being of substantially equal cross-sectional area, and the cross-sectional configuration of the elbow-shaped air inlet duct including a high velocity portion and a low velocity portion, the low velocity portion being of non-circular shape in any plane intermediate its ends such that the air mass throughout the high velocity portion of the elbow-shaped inlet duct is equal to the air mass flowing through the low velocity portion of the air inlet duct at any plane along its length and transverse to its longitudinal axis;

a plurality of outlet portions, each having an outlet port in air flow communication with said plenum, each of said outlet ports being substantially equally spaced along the length of said plenum, the cross-sectional area of the outlet port of each outlet portion being substantially equal to the cross-sectional flow area of said plenum and of said air inlet portion; and a diverter partition extending integrally from the direction of the inner wall of said plenum in a direction toward the mid-point of said air inlet for diverting incoming air flow and evenly distributing the air flow to each of the respective outlet ports.

13. The invention of claim 12 wherein the air inlet duct at the elbow is measured in the plane transverse to the length of the duct includes a high velocity portion of hemispherical shape through 180° and having a radius equal to that at the air inlet duct inlet and outlet, and wherein the low velocity portion of the cross-sectional area is rectangular shape and has an overall area larger than that of the high velocity area portion at a ratio of 1.5:1 to 2:1 at the point along its length of greatest differential in air velocity.

14. The invention of claim 12 wherein the cross-sectional area of the high velocity portion is sized relative to the cross-sectional area of the low velocity portion pursuant to the equation:

$$\rho_1 V_1 A_1 = \rho_2 A_2 V_2$$

wherein:
$\rho_1$=air density in;
$\rho_2$=air density out;
$V_1$=air velocity in;
$V_2$=air velocity out;
$A_1$=cross-sectional area of the air inlet duct 62 at its inlet taken at a plane transverse to its length;
$A_2$=cross-sectional area of the air inlet duct 62 at its outlet 90 taken at a plane transverse to its length.

* * * * *